United States Patent
Kron et al.

(10) Patent No.: US 7,067,177 B2
(45) Date of Patent: Jun. 27, 2006

(54) PROCESS FOR COATING SURFACES USING HYBRID POLYMER MATERIALS

(75) Inventors: Johanna Kron, Eussenhelm (DE); Karl Deichmann, Wurzburg (DE); Gerhard Schottner, Heilsbronn (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 10/292,272

(22) Filed: Nov. 12, 2002

(65) Prior Publication Data

US 2003/0152708 A1 Aug. 14, 2003

(30) Foreign Application Priority Data

Nov. 13, 2001 (DE) .......................... 101 55 613

(51) Int. Cl.
*B05D 7/14* (2006.01)

(52) U.S. Cl. ...................... 427/387; 427/409
(58) Field of Classification Search ................. 427/387, 427/409
See application file for complete search history.

(56) References Cited

U.S. PATENT DOCUMENTS

| | | | | | |
|---|---|---|---|---|---|
| 4,746,366 | A | * | 5/1988 | Philipp et al. ......... | 106/287.19 |
| 5,952,044 | A | * | 9/1999 | Deichmann et al. ........ | 427/230 |
| 6,054,546 | A | * | 4/2000 | Suzuki et al. ................. | 528/15 |
| 6,534,187 | B1 | | 3/2003 | Kron et al. | |
| 6,534,197 | B1 | * | 3/2003 | Noda et al. ................. | 428/689 |

FOREIGN PATENT DOCUMENTS

| | | | |
|---|---|---|---|
| DE | 34 07 087 | | 5/1988 |
| DE | 38 28 098 | | 3/1990 |
| DE | 3836815 | * | 7/1990 |
| DE | 4205819 | * | 9/1993 |
| DE | 43 03 570 A1 | | 8/1994 |
| DE | 196 53 480 A1 | | 6/1998 |
| EP | 0 358 011 B2 | | 8/1989 |
| EP | 365027 | * | 4/1990 |
| EP | 0 610 831 | | 8/1994 |
| EP | 722911 | * | 7/1996 |
| EP | 856560 | * | 8/1998 |

OTHER PUBLICATIONS

Ito et al, Progress in Organic Coatings, 32(1–4), pp 97–107, 1997.*

Amberg–Schwab et al, Journal of Sol–Gel Science and Technology, 19(1/2/3), pp 125–129, 2000.*

Kim et al, Journal of Sol–Gel Science and Technology, 19(1/2/3), pp 607–610, 2000.*

* cited by examiner

*Primary Examiner*—Erma Cameron
(74) *Attorney, Agent, or Firm*—Thompson Coburn LLP

(57) ABSTRACT

A process for coating surfaces by hybrid polymer materials and the coating solutions and compositions used in this process are described.

13 Claims, No Drawings

PROCESS FOR COATING SURFACES USING HYBRID POLYMER MATERIALS

This patent application claims the benefit of priority under 35 U.S.C. §119 of German Patent Application DE 101 55 613.6, filed on Nov. 13, 2001, incorporated herein in its entirety by reference.

The invention relates to a process for coating surfaces by hybrid polymer materials and the coating solutions and compositions used in this process.

For many applications, surfaces of substrates, in particular aluminium surfaces, are pretreated by means of chromating processes for the purpose of improved adhesion and for corrosion protection and then painted with organic one- or multilayer systems. However, chromating will have to be replaced by chromium-free treatments both on aluminium and on other metal surfaces because of the toxicity of chromium(VI) compounds..

Sol-gel based coatings represent a basic alternative to chromating and are described, for example, in the patent applications DE 38 28 098, DE 34 07 087 and EP-A 0 610 831. For sol-gel based coatings to represent a true alternative to chromating processes and to be able to be developed to marketable products, a number of requirements are to be imposed. These are explained briefly below:

1. The sols should be methanol-free.
2. The sols should be aqueous, i.e. in the ideal case free from further solvents, and have a high flash point.
3. The sol synthesis should be technically simple and therefore inexpensive.
4. The starting substances required for the preparation should be inexpensive.
5. The sols should have the longest possible storage and pot lives and it should be possible to apply them by means of wet painting processes, such as dipping or spraying.
6. The treatment of the substrate should be possible at room temperature and require only short treatment times, the maximum curing conditions to be mentioned being 10 to 15 minutes at 80° C. to 120° C.
7. The layer thicknesses should be below one micrometer and the layer should have a good adhesion to the surfaces of various aluminium alloys.
8. A good binding to various primer and top layers is also to be required.
9. A simultaneous replacement of chromating and the primer for e.g. 2C PU wet paints is furthermore to be aimed for.
10. The coated substrates should show deformability in the mandrel flex test according to ISO 6860 (5 mm mandrel for 0.5 mm metal sheets).
11. They should furthermore be resistant in the boiling test with wet adhesion according to GBGPB of GSB International, in the condensation climate test according to DIN 50017 (14 days) and in the acetic acid salt spray test (ASS according to ISO 9277; 1,000 hours).
12. Finally, a reduction in the filiform corrosion is to be required for various top coat composites.

The sol-gel materials described in the abovementioned patent application meet only some of the abovementioned requirements. Most sols cannot be converted into purely aqueous systems, cannot be stored (e.g. materials according to DE 38 28 098) or fail in the mandrel flex test in layer composites with wet or powder paint systems (e.g. materials according to DE 38 28 098 and DE 34 07 087 because of a lack of flexibility and also materials according to EP 0 610 831 with a relatively low surface energy) or under extreme test conditions, such as the acetic acid salt spray test according to ISO 9277 (e.g. all the materials according to DE 34 07 087 and materials according to EP 0 610 831 which contain esters of titanium or zirconium).

The invention is based on the object of providing a process for coating substrate surfaces, in particular aluminium surfaces, with which coatings which have the abovementioned profile of properties can be obtained.

The invention relates to a process for coating surfaces, comprising the following stages:
a) hydrolytic condensation, optionally in the presence of a condensation catalyst and/or additives, of the following components:
(i) a crosslinkable silane of the formula (II)

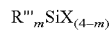

in which the groups X, which can be identical or different, denote hydrogen, halogen, alkoxy, acyloxy, alkylcarbonyl, alkoxycarbonyl or —NR″₂ (R″=H and/or alkyl) and the radicals R′″, which can be identical or different, represent alkyl, alkenyl, alkinyl, aryl, arylalkyl, alkylaryl, arylalkenyl, alkenylaryl, arylalkinyl or alkinylaryl, wherein these radicals can be interrupted by O or S atoms or the group —NR″ and can carry one or more substituents from the group consisting of halogens and optionally substituted amino, amide, aldehyde, keto, alkylcarbonyl, carboxyl, mercapto, cyano, hydroxyl, alkoxy, alkoxycarbonyl, sulphonic acid, phosphoric acid, acryloxy, methacryloxy, epoxide or vinyl groups, and m has the value 1, 2 or 3, and/or an oligomer derived therefrom, wherein the radical R′″ and/or the substituent is or includes a crosslinkable epoxide group, in an amount of 10 to 98 mol %, based on the total number of moles of the hydrolysable starting components, and
(ii) an aluminium alkoxide of the formula (III)

wherein the radicals R′, which can be identical or different, represent alkyl or —(CH₂)ₓ—O—(CH₂)ᵧ—CH₃, wherein x denotes an integer from 1 to 6 and y denotes an integer from 0 to 6, in an amount of 5 to 75 mol %, based on the total number of moles of the hydrolysable starting components, component (ii) being complexed e.g. with a β-dicarbonyl compound,
b) addition of a prepolymer or reactive diluent which is optionally crosslinkable with component (i), to the hydrolytic condensate obtained according to (a), it being possible for the prepolymers to build up an interpenetrating network, and
c) application of the coating solution obtained according to (b) to a substrate and drying of the coating.

The invention is based on the surprising finding that only systems comprising a crosslinkable epoxysilane of the formula (II) and a complexed aluminium alkoxide of the formula (III) in combination with a prepolymer or reactive diluent which is crosslinkable or builds up interpenetrating polymer structures simultaneously fulfil all the abovementioned properties.

Glycidyloxypropyltrialkoxysilanes, in particular 3-glycidyloxypropyltrimethoxysilane, are preferably used as crosslinkable epoxysilanes of the formula (II).

A preferred aluminium alkoxide of the formula (III) is aluminium sec-butylate (ASB).

In the context of the present invention, alkyl radicals are straight-chain, branched or cyclic radicals having 1 to 20, preferably 1 to 10 carbon atoms, and in particular lower alkyl radicals having 1 to 6, preferably 1 to 4 carbon atoms.

Specific examples are methyl, ethyl, n-propyl, isopropyl, n-butyl, sec-butyl, tert-butyl, isobutyl, n-pentyl, n-hexyl, dodecyl, octadecyl and cyclohexyl.

In the process according to the invention, the aluminium alkoxides of the formula (III) are chelated with chelate ligands known per se in a ratio of 1:0.5–2 before they are subjected to the hydrolytic condensation. A ratio of about 1:1 is preferred. Preferred chelate ligands are acetylacetone and ethyl acetoacetate.

Alternatively, starting compounds which are already complexed can be employed in the processes according to the invention. These are known to the expert and are commercially available. Reference is made to the ABCR catalogue "Metal-Organics for Material & Polymer Technology" from 2001. Of the aluminium compounds and aluminium complexes listed on pages 60 to 64, in particular the following are particularly suitable for use in the process according to the invention:
aluminium n-butoxide, aluminium s-butoxide, aluminium s-butoxide-bis(ethyl acetoacetate), aluminium t-butoxide, aluminium 5-chloro-8-hydroxyquinolinate, aluminium di-s-butoxide-ethyl acetoacetate, aluminium diisopropoxide-ethyl acetoacetate, aluminium methoxide, aluminium methoxyethoxyethoxide, di-s-butoxyaluminoxytriethoxysilane, triethyl(tri-s-butoxy) aluminium, aluminium methacrylate, aluminium-9-octadecenyl acetoacetate-diisopropoxide, aluminium(III) 2,4-pentanedionate-aluminium acetylacetonate, aluminium phenoxide, aluminium stearate, aluminium(III) 2,2,6,6-tetramethyl-3,5-heptanedionate, aluminium hexafluoropentanedionate, aluminium 3-hydroxy-2-methyl-4-pyronate, aluminium 8-hydroxyquinolinate, aluminium isopropoxide, alumatrane and aluminium acrylate.

The prepolymers employed in the process according to the invention optionally crosslink with the crosslinkable groups of the radical R''' according to formula (II) and/or the crosslinkable substituents on this radical, in particular the epoxide groups.

Such prepolymers are known per se to the expert and are described, for example, in EP-A 0 610 831.

Reactive diluents can also be employed instead of or in combination with such prepolymers in the context of the present invention.

These prepolymers enable flexibilization of the layer, since they bind to the silane component and/or can form interpenetrating organic polymer structures. The organic prepolymers are preferably already to be employed as an aqueous emulsion or dispersion.

The best layer properties are obtained with those prepolymers which cannot crosslink with the silane component, but build up an independent interpenetrating network to the network of the hydrolysed condensate.

Further embodiments of the invention are the subject matter of patent claims 1 to 13.

The hydrolysis of the sols can be catalysed by either dilute acid or the addition of an aminosilane. A preferred aminosilane is aminoethyltriethoxysilane. Silanes containing mercapto groups can also be employed as the condensation catalyst.

A solvent exchange is preferably carried out after the hydrolysis: In this, volatile constituents are removed in vacuo at room temperature. Too high a condensation and therefore gelling of the mixtures, which would take place at higher temperatures, is avoided by this means. Water is then added to the resulting resins, while stirring.

While low-viscosity, aqueous-alcoholic sols with a relatively low flash point initially result in the sol synthesis, with the process according to the invention it is possible to prepare the sols virtually without additional solvents and therefore to enable a relatively easy access to solvent-free or low-solvent systems.

According to a further preferred embodiment, the hydrolysed sol is initially diluted further with water and the readily volatile organic solvents are only then removed in vacuo. Aqueous sots with the same molecular weight distribution result from both processes.

From the metal compounds, it was possible to incorporate the aluminium component into the aqueous systems in amounts of up to 35 mol % (based on the hydrolysable components). Analogous titanium and zirconium compounds precipitate out as metal oxides under basic catalysis.

The following requirements can be met simultaneously with the materials mentioned:

1. The methanol-free sots according to the invention can be prepared by two different procedures; by the use of ethoxy compounds or by subsequent solvent exchange. [The variant via solvent exchange is to be preferred, since the preparation process is simpler (ethoxy compounds had too long hydrolysis times).]
2. Aqueous sots can be prepared with flash points >50° C.
3. A simple, inexpensive synthesis of the aqueous sols according to the invention is possible.
4. Inexpensive systems are accessible by using 2%–5% sols.
5. Application of the sols according to the invention by means of wet painting processes is easily possible by brief dipping (or spraying) at room temperature.
6. The storage stability of the sots according to the invention is at least 6 months.
7. The intermediate drying of max. 10 min at 120° C. is sufficient.
8. Undercoats according to the invention can be achieved with layer thicknesses of $\leq 1$ μm.
9. The adhesion of the layers according to the invention to the surfaces of various aluminium alloys is very good.
10. The initial adhesion of the aluminium surfaces treated according to the invention to 2C PU wet paints or layer systems of 2C EP primer and 2C PU top paint and also to various polyester-based powder paint systems is very good.
11. The maximum deformability of the coated substrates in the mandrel flex test according to ISO 6860 exists around a 2 mm mandrel for the 2C PU wet paint system without a primer. Deformability around a 5 mm mandrel is possible for all layer systems.
12. Resistance to moisture in the condensation climate test according to DIN 50017 and in the boiling test according to GPB of GSB International exists for all the layer composites tested.
13. Resistance in the acetic acid salt spray test (ASS according to ISO 9277) can be achieved both for the wet paint system—independently of the use of a primer—and for the powder paints.
14. After 1,000 h of the FFC test according to EN 3665, the filiform corrosion on the aluminium surfaces treated according to the invention is reduced significantly at least with the wet paint systems. The results of the investigations here were also largely independent of the use of a primer.

The invention will now be explained in more detail by the following examples and comparison examples:

EXAMPLE 1

18.91 g 3-glycidyloxypropyltrimethoxysilane (GPTMS) are stirred, while cooling with ice. 4.93 g aluminium trisec-butylate (ASB) are mixed with 5.28 g isopropanol in a separate glass flask, 2.00 g acetylacetonate are added slowly and the mixture is added to the reaction mixture. 1.02 g 0.1 molar phosphoric acid and 5.41 g distilled water are then added very slowly. After stirring for 2 hours at room temperature, volatile constituents are removed at room temperature under a high vacuum and replaced by distilled water. 929.27 g distilled water and 3.02 g epoxy resin, which has been dispersed in 30 g water beforehand, are then added.

The sol obtained in this was has a flash point of >65° C. and can be stored for approx. 6 months at 4° C.

EXAMPLES 2–5

Comparable sols are also obtained with the compositions listed in table 1.

TABLE 1

| Composition | Example 2 | Example 3 | Example 4 | Example 5 |
|---|---|---|---|---|
| Glycidyloxy-propyltri-methoxysilane (GPTMS) | 6.62 g | 4.61 g | 9.45 g | 9.22 g |
| Aminopropyl-triethoxysilane (AMEO) | — | 0.33 g | — | 0.66 g |
| Aluminum tri-sec-butylate (ASB) | 1.72 g | 2.22 g | 2.46 g | 4.43 g |
| Acetylacetonate | — | 0.90 g | 1.07 g | 1.8 g |
| Ethyl acetoacetate | 0.91 g | — | — | — |
| Phosphoric acid (0.1 M) | 0.36 g | — | 0.51 g | — |
| Organic additive[1] | 1.23 g[2] | 0.5 g[3] | 1.75 g[4] | 2.05 g[5] |
| Water | 264.42 g | 225.48 g | 377.71 g | 476.65 g |
| Solvent[6] | 2.01 g | 2.60 g | 2.92 g | 5.24 g |

[1]Examples of organic additives: prepolymers or reactive diluents as crosslinking agents or for building up an interpenetrating (cf. 2–5)
[2]Epoxy resin emulsion
[3]Epoxy resin
[4]Acrylate dispersion
[5]Acrylate
[6]Examples of solvents: iso-propanol, n-butanol, s-butanol, butoxyethanol The coating experiments and the tests carried out on the coated specimens are explained in more detail below (see "Coating experiments" and tables 2–7).

Comparison Example 1

23.80 g phenyltrimethoxysilane (PhTMO), 37.25 g methacryloxypropyltrimethoxysilane (MEMO) and 7.39 g aluminium sec-butylate, which has been reacted with 3.00 g acetylacetonate beforehand, are mixed with one another in a 3-necked flask, while cooling with ice. 19.23 g distilled water are then added dropwise initially very slowly (⅓ of the amount in the course of 15 min) and then somewhat faster (remaining amount in approx. 5 min). After stirring for 2 h at room temperature, 14.61 g ethyl acetate, 4 g tetraacrylate and 2.8 g of a photoinitiator are added in succession. A clear, low-viscosity solution is formed.

Comparison Example 2

59.5 g phenyltrimethoxysilane (PhTMO), 460.1 g glycidyloxypropyltrimethoxysilane and 26.9 g aminopropyltriethoxysilane are brought together and stirred, while cooling with ice. 78.1 g ethyl acetoacetate are added to 147.8 g aluminium sec-butylate and the mixture is added slowly to the reaction solution. 182.3 g water are cautiously added, while stirring and maintaining the cooling with ice. After conclusion of the hydrolysis, 88.6 g epoxy resin D.E.R. 330 (Dow Corning Company) are stirred into the hydrolysis product.

Comparison Example 3

46.1 g glycidyloxypropyltrimethoxysilane and 3.3 g aminopropyltriethoxysilane are brought together and stirred, while cooling with ice. 11.8 g ethyl acetoacetate are added to 29.6 g Zr(OPr)$_4$ and the mixture is added slowly to the reaction solution. 19 g water are cautiously added, while stirring and maintaining the cooling with ice. After conclusion of the hydrolysis, 10.6 g epoxy resin D.E.R. 330 (Dow Corning Company) are stirred into the hydrolysis product.

Comparison Example 4

46.1 g glycidyloxypropyltrimethoxysilane and 3.3 g aminopropyltriethoxysilane are brought together and stirred, while cooling with ice. 7.8 g ethyl acetoacetate are added to 20.4 g Ti(OBu)$_4$ and the mixture is added slowly to the reaction solution. 19 g water are cautiously added, while stirring and maintaining the cooling with ice. After conclusion of the hydrolysis, 9.6 g epoxy resin D.E.R. 330 (Dow Corning Company) are stirred into the hydrolysis product.

The coating experiments described below were carried out with the sols described in examples 1–5 and comparison examples 1–4.

Coating Experiments

Test sheets of the aluminium alloys AlMg1 and AlMgSi1 approx. 10×10 cm in size were used for the investigations. Because of the large number of possible coating variants, a restriction was imposed in that the alloy AlMg1 was used in the first instance. However, AlMgSi1 substrates were also employed in many experiments.

The coating parameters are contained in table 3. All the sheets were pretreated with elma clean 100 (Elma clean) or by means of P3 almeco 18 in accordance with the instructions of Henkel. The following procedures are standard methods:

Elma Clean 100:
  Cleaning with an aqueous 5% elma clean 100 solution in an ultrasonic bath at 80° C.
  Rinsing with completely demineralized water at room temperature
  Drying in a circulating air oven at 50° C.

P3 Almeco 18:
  Cleaning with an aqueous 3.5% P3 almeco 18 solution in an ultrasonic bath at 70° C.
  Rinsing with completely demineralized water at room temperature
  Treatment with an aqueous 3% Deoxidizer 395H solution in an ultrasonic bath at 30° C.
  Rinsing with completely demineralized water at room temperature
  Drying in a circulating air oven at 50° C.

Properties of the Layers on Aluminium Surfaces

In the first series of experiments pretreated test sheets were coated by the dipping process (dipping or drawing speed: 10 cm/min, residence time: 2 sec) and cured for 90 min in a circulating air drying cabinet at 130° C. and the properties of the coated aluminium sheets were determined after storage for 24 h at room temperature (table 4). The following tests were employed for the layers:

Cross-hatch test according to ISO 2409
Boiling test according to GPB of GSB International
Condensation climate test according to DIN 50017

Both the solvent-containing and the aqueous systems initially adhere very well to the surfaces of the aluminium alloys tested, and also after the exposure to moisture in the boiling test and the condensation climate test.

On the basis of the good starting results, all the systems were synthesized again and employed as a substituted for chromating in coating experiments using various top layer systems.

Properties of Treated Aluminium Surfaces Combined with 2C PU Wet Paint or a Layer System of 2C EP Primer and 2C PU Top Paint A conventional wet paint coating composite for aluminium surfaces comprises a 2C EP primer and a 2C PU top paint. The 2C EP primer otherwise usually used was initially consciously omitted here, in order to test whether chromating and the primer can be replaced simultaneously with the treatment. Sheets were also provided with the complete paint system for comparison purposes.

Pretreated and coated test sheets were now intermediately dried in a circulating air drying cabinet for 10 min at 120° C. and overpainted either with the 2C PU wet paint or with the complete paint system. In order to be able to compare the large number of various systems of the abovementioned examples and comparison examples and the associated variations with one another, the conditions for the intermediate drying of the layers were maintained in the entire test period. The spray application of the 2C systems was carried out manually by means of SATAminijet flow cup guns (Sata). After each application of paint the layers were dried for 30 min at 80° C. All the pretreatment and coating steps were carried out on one day.

Before the corresponding laboratory tests, the coated aluminium sheets were first conditioned for one week at room temperature. The properties of the coated aluminium sheets are shown in table 5. The first test criteria for the layer composite were again the cross-hatch test according to ISO 2409
the boiling test according to GPB of GSB International
the condensation climate test according to DIN 50017

The initial adhesion is also very good in all cases here (ch 0/0; the cross-hatch characteristic values are 0 even after additional peeling off of tesa film), i.e. as expected, the layers adhere to the aluminium substrates investigated, but the adhesion in the intermediate layer with the top coating is good.

Nevertheless, adhesion problems in the cross-hatch test after exposure to moisture occurred in comparison examples 1 and 2 with very high contents of the relatively hydrophobic silanes PhTMO and MEMO. These systems were therefore not investigated further and are not listed in table 5.

The abovementioned tests allow only a very small differentiation in respect of the various systems on the AlMg1 and AlMgSi1 sheets. All the coating variants which tested positive were therefore each applied to 3 aluminium sheets approx. 20×10 cm in size and tested for resistance to filiform corrosion in accordance with EN 3665.

Furthermore
the mandrel flex text according to ISO 6860 (2 mm mandrel) and
the acetic acid salt spray mist test ASS according to ISO 9277 with determination of the degree of blistering according to DIN ISO 53209 were carried out.

Surprisingly, the mandrel flex test without 2C EP primer was passed only by the systems according to the invention (tab. 5). This test showed further differences which point in the same direction as the adhesion after exposure to moisture. All the layer composites already failed here as soon as the relatively hydrophobic silanes PhTMO and MEMO were employed (see comparison examples 1 and 2).

For the ASS test, which is also time-consuming, it was found in the first series of experiments that only those layer systems which have an unlimited miscibility with water and do not flake in the mandrel flex test around a 2 mm mandrel are investigated. In the further test series, in each case routinely coated aluminium sheets were prepared for the ASS test. Analogously to the filiform corrosion test, in each case 3 coated aluminium sheets were also employed in the ASS test.

The systems according to the invention which comprise the components GLYMO, AMEO and aluminium alkoxide, but no further metal alkoxides, showed the best results in the ASS test. After a test period of 1,000 h, the particular paint system of the aluminium sheets on the undercoated areas is either unchanged (=m0/g0; degree of blistering according to DIN 53209), or at most a relatively slight blistering of the paint is detectable (=m1/g3–4; degree of blistering according to DIN 53209), while the 2C PU top layer or the complete layer composite of 2C EP primer and 2C PU top paint is usually detached over large areas on untreated areas (=mg5/g5) (tab.6).

In direct comparison, the more complex layer build-up with 2C EP primer and 2C PU top layer gives either the same or only a slightly better result than the system composite with 2C PU wet paint. Layers of base-catalysed sols always offer better protection than those of acid-catalysed sols. Slight differences depending on the cleaning procedure can also be detected in the ASS test; treatment with P3 almeco 18 usually shows somewhat better results.

Surprisingly, all the variants of comparison examples 4 and 5, in which (for the formation of mixed oxides) all or some of the aluminium alkoxide is replaced by zirconium ester or titanium ester, showed only a very slight to even no protective action in the ASS test.

The results of the testing for filiform corrosion after 1,000 h in a climatically controlled cabinet are also listed in table 5. The values stated in $mm^2/cm$ correspond to the area affected by corrosion in respect of the defect length. The first value in each case relates to the area without and the second value to the area with undercoating.

The values are lower and therefore better on the treated area than the comparison values of untreated specimens.

If the evaluation levels according to tab. 6 are taken as the basis, stage IV is the maximum reached. In this series of tests, the examples according to the invention which comprise only aluminium as a heteroelement give the best results. In the FFC test also, the protective action of the coatings according to comparison examples 3 and 4 was reduced significantly compared with the layers according to the invention.

The results of commercially chromated and coated aluminium sheets are also listed in table 5 for comparison. Significant differences occurred here—depending on the paint build-up—after exposure to moisture in the boiling test and in the condensation climate test.

The 2C PU top paint alone flakess off from the chromated AlMg1 sheets in the cross-hatch test after the boiling and condensation climate test. However, the layer build-up of 2C EP primer and 2C PU wet paint envisaged for chromated aluminium surfaces is resistant under the test conditions mentioned. In the ASS and FFC test, initial damage also occurred independently of the use of the 2C EP primer (blistering in the ASS test and filiform corrosion in the FFC test). The filiform corrosion is indeed somewhat less than on treated aluminium sheets, but also already to be evaluated with level IV. On the other hand, the wet paint layer composites in combination with the systems according to the invention always show less blistering in the ASS test.

Properties of Treated Aluminium Surfaces Coated with PES/Primid or PES/PT 910 Powder Paint The various ORMO-CER sols were also tested as a chromating substitute for powder coating with a polyester/Primid or polyester/PT 910 system. The pretreated test sheets coated with the sols from the examples and comparison examples were again dried in a circulating air drying cabinet for 10 min at 120° C. Complete coating of the specimens on one day was not possible in this case. All the aluminium sheets were finished with the various systems within one week (2 aluminium sheets approx. 10×10 cm and 6 approx. 20×10 cm in size per variant). The powder coating was then carried out in one operation in an industrial powder coating plant. Curing was carried out for 20 min at 165° C. and additionally 12 min at 180° C.

Before the laboratory tests, the powder-coated aluminium sheets were also conditioned for at least one week at room temperature. The test criteria for the layer composite were the same as for the wet paints.

The properties of the coated aluminium sheets are shown in table 7. Here also, in all cases the adhesion is very good initially and after the boiling test and the condensation climate test, i.e. the layers adhere both to the aluminium substrates investigated and in the intermediate layer with the top coating. In contrast to the investigations with PU wet paint, the adhesion without undercoating was also good here. The adhesion, boiling test and condensation climate test thus allow no differentiation for the powder paint tested.

The resistance in respect of the mandrel flex test is comparable to the results with wet paint.

After 1,000 h of the ASS test, the top layer of the aluminium sheets on the undercoated areas is either unchanged (=m0/g0), or at most a relatively slight blistering of the paint is detectable (=m1/g3). Non-treated areas already show detachment and filiform corrosion on some specimens.

Powder-coated aluminium sheets of the two alloys were also tested for resistance to filiform corrosion after seeding with HCl and 1,000 h in a climatically controlled cabinet. The results are also summarized in table 7. In the case of powder coating with a polyester/Primid system, undercoating appears to have no influence on the resistance to filiform corrosion. The values for the filiform corrosion vary very widely both on treated and on untreated areas.

For comparison, chromated AlMg1 sheets were also coated with PES/Primid powder paint and tested. Differences to the treatment chiefly exist after 1,000 hours of exposure in the ASS and FFC test. In the case of the chromated sheets, filiform corrosion occurred after both tests, the corrosive attack in the ASS test even being more pronounced than in the FFC test.

TABLE 2

| | Example | | | | | |
|---|---|---|---|---|---|---|
| | Comp. ex. 1 | Comp. ex. 2 | Example 4/5 | Examples 1–3 | Comp. ex. 3 | Comp. ex. 4 |
| Composition | acrylate-based | epoxide-based | epoxyacrylate-based | epoxide-based | epoxide-based/Zr | epoxide-based/Ti |
| ROH | 44.1%[1] | 52.6%[1] // <20%[2] | 19.9%[1] <1%[2] | 19.6%[1] // 1%[2] | 60%–80% | 60%–80% |
| MeOH | 20.3%[1] | 14.7%[1] // <2%[2] | 8.2%[1] <<1%[2] | 8.9%[1] // <<1%[2] | 6.0%[1] // <<1%[2] | 6.4%[1] // <<1%[2] |
| Miscibility with water | <10%[3,4] | <30%[3,4] | unlimited[3,4] | unlimited[3/4] | <10%[3] // | <10%[3] // |
| Flash point (DIN 55679) | 20° C. | 24° C.[1] // 52° C.[2] | 30° C.[1] // 65° C.[2] | 30° C.[1] // 76° C.[2] | 21° C.[1] // 45° C.[2] | 21° C.[1] // 52° C.[2] |

[1] without solvent exchange
[2] after solvent exchange
[3] base-catalysed
[4] acid-catalysed

TABLE 3

| Coating parameters | |
|---|---|
| Specimen pretreatment | elma clean or almeco 18 |
| Aluminum alloy | AlMg1 (or AlMgSi1) |
| Sol coating | dipping |
| Curing (tab. 4) | 90 min/130° C. |
| Intermediate drying | 10 min/120° C. |
| Top coating (variant 1) | 2C PU wet paint (spraying) |
| Drying (tab. 5) | 30 min/80° C. |
| Top coating (variant 2) | powder paint PES/Primid or PT 910 (spraying) |
| Curing (tab. 7) | 20 min/165° C. and 12 min/180° C. |

TABLE 4

Properties of the layers on aluminium surfaces

| | Comp. ex. 1 | Comp. ex. 2 | Example 5 | Example 4 | Examples 1–3 | | Comp. ex. 3 | Comp. ex. 4 |
|---|---|---|---|---|---|---|---|---|
| Formulation | GU 125 | GU 133 (126) | ARA 102 (GU 124) | ARA 346 | GU 145 | | GU 156 | ARA/287 |
| Al alloy | AlMg1 | AlMgSi1 | AlMg1 | AlMgSi1 | AlMg1 | AlMgSi1 | AlMg1 | AlMg1 |
| Layer thickness | 4 μm | 4 μm | 2 μm | 3 μm | 1.5 μm | 1 μm | <3 μm | 4 μm | 4 μm | 2 μm | 2 μm |
| Adhesion (ISO 2409) | ch 0/0 | ch 0/0 | ch 0/0 | ch 0/0 | ch 0/0 | ch 0/0 | ch 0/0 | ch 0/0 | ch 0/0 |
| Boiling test (GSB) | ch 0/0 | ch 0/0 | ch 0/0 | ch 0/0 | ch 0/0 | ch 0/0 | ch 0/0 | ch 0/0 | ch 0/0 |
| CC (DIN 50017) | ch 0/0 | ch 0/0 | ch 0/0 | ch 0/0 | ch 0/0 | ch 0/0 | ch 0/0 | ch 0/0 | ch 0/0 |

TABLE 5

Properties of treated aluminium surfaces coated with 2C PU wet paint

| | Comp. ex. 1 | | Comp. ex. 1 | | Example 5 | | | | | | |
|---|---|---|---|---|---|---|---|---|---|---|---|
| | GU 125 | | GU 126.2 | | GU 124.1 | | GU 143.1.2 | GU 152 | | GU 143.1.1 | GU 152 |
| Al alloy | AlMg1 | AlMgSi1 | AlMg1 | AlMgSi1 | AlMg1 | AlMgSi1 | AlMg1 | | | AlMg1 | |
| Pretreatment | elma clean 100 | | elma clean 100 | | elma clean 100 | | P3 almeco 18 | | elma clean 100 | P3 almeco 18 | |
| Dilution (ORM/H₂O) | — | | — | | | | 1/2 | | | 1/50 | |
| Primer | no | | no | | no | | yes | <1 μm | no | yes | |
| Layer thickness S | 3 μm | 4 μm | 5 μm | 4 μm | 1 μm | 1 μm | 1 μm | 1 μm | <1 μm | <1 μm | <1 μm |
| Layer thickness TP | 49 μm | 44 μm | 37 μm | 41 μm | 35 μm | 46 μm | 35 μm | 85 μm | 30 μm | 35 μm | 80 μm |
| Adhesion (ISO 2409) | ch 0/0 | ch 0/0 | ch 0/0 | ch 0/0 | ch 0/0 | ch 0/0–1 | ch 0/0 | ch 0/0–1 | ch 0/0–1 | ch 0/0–1 | ch 0/0–1 |
| Boiling test (GSB) | ch 0/0 | ch 0/5 | ch 0/0 | ch 0/0 | ch 0/0 | ch 0/0 | ch 0/0–1 | ch 0/0–1 | ch 0/0–1 | ch 0/0–1 | ch 0/0–1 |
| CC (DIN 50017) | ch 0/0 | ch 0/0 | ch 0/0–1 | ch 0/0–1 | ch 0/0–1 | ch 0/0–1 | ch 0/0–1 | ch 0/0 | ch 0/0–1 | ch 0/0–1 | ch 0/0–1 |
| Mandrel flex test (ISO 6860) | flaked[2] | flaked[2] | flaked[2] | flaked[2] | o.k[2] | o.k[2] | o.k[2] | cracks[3] | o.k[2] | o.k[2] | small cracks[3] |
| ASS (ISO 9277; 1,000 h) | n.d. | n.d. | n.d. | n.d. | m5/g5[4] m1/g3 | n.d. | m5/g5[4] m1/g2 | 5/g5[4] m 1/g2 | m5/g5[4] m1/g4 | m5/g5[4] m1/g4 | m5/g5[4] m1/g4 |
| FFC (EN 3665; 1,000 h) [mm²/cm] | 48[4]/17 | 88[4]/39 | 40[4]/19 | 37[4]/13 | 33[4]/26 | 33[4]/27 | 47[4]/19 | 80[4]/27 | 96[4]/37 | 44[4]/29 | 83[4]/25 |

TABLE 5-continued

Properties of treated aluminium surfaces coated with 2C PU wet paint

| | Example | | | |
|---|---|---|---|---|
| | Example 4 | Examples 1–3 | | Comp. ex. 3 |
| | | Formulation | | |
| | ARA 346 | GU 145/146 | | GU 156 |
| Al alloy | AlMg1 | AlMg1 | | AlMg1 |
| Pretreatment | P3 almeco 18 | P3 almeco 18 | | P3 almeco 18 |
| Dilution (ORM/H$_2$O) | 1/2 | 1/2 | 1/50 | 1/2 |
| Primer | no | no | | yes | no |
| Layer thickness S | <3 μm | 6 μm | 4 μm | 1 μm | 1 μm |
| Layer thickness TP | 60 μm | 20 μm | 40 μm | 90 μm | 60 μm |
| Adhesion (ISO 2409) | ch 0/0 | ch 0/0–1 | ch 0/0–1 | ch 0–1/0–1 | ch 0–1/0–1 |
| Boiling test (GSB) | ch 0/0 | ch 0/0–1 | ch 0/0–1 | ch 0–1/0–1 | ch 3/5 |
| CC (DIN 50017) | ch 0/5 | ch 0/0–1 | ch 0/0–1 | ch 0–1/0–1 | ch 0–1/0–1 |
| Mandrel flex test (ISO 6860) | o.k.[3] | o.k.[2] | o.k.[2] | o.k.[3] | o.k.[3] |
| ASS (ISO 9277; 1,000 h) | m5/g5[4] m0/g4 | m2/g5[4] m0/g0 | m5/g5[4] m0/g0 | m5/g5[4] (250 h) | m5/g5[4] (250 h) |
| FFC (EN 3665; 1,000 h) [mm$^2$/cm] | 44[4]/27 | 57[4]/28 | 49[4]/34 | 105[4]/65 | n.b. |

| | Example | | |
|---|---|---|---|
| | Comp. ex. 4 | | Chromated |
| | Formulation | | |
| | GU 155 | | — |
| Al alloy | AlMg1 | | AlMg1 |
| Pretreatment | P3 almeco 18 | | P3 almeco 18 |
| Dilution (ORM/H$_2$O) | 1/2 | | — |
| Primer | yes | no | yes | no |
| Layer thickness S | 1 μm | 2 μm | 0.5 g/m$^2$ | 0.5 g/m$^2$ |
| Layer thickness TP | 69 μm | 64 μm | 100 μm | 60 μm |
| Adhesion (ISO 2409) | ch 0–1/0–1 | ch 0–1/0–1 | ch 0/0 | ch 0/0 |
| Boiling test (GSB) | ch 0–1/0–1 | ch 0–1/0–1 | ch 0/0 | flaked |
| CC (DIN 50017) | ch 0–1/0–1 | ch 0–1/0–1 | ch 0/0 | flaked |
| Mandrel flex test (ISO 6860) | flaked[3] | o.k.[3] | cracks[3] | o.k.[3] |
| ASS (ISO 9277; 1,000 h) | m5/g5 (500 h) | m5/g5 (500 h) | m2/g5 | m2/g5 |
| FFC (EN 3665; 1,000 h) [mm$^2$/cm] | 85[4]/46 | n.d. | 10 | 13 |

[1] a = acid
[2] 2 mm mandrel
[3] 5 mm mandrel
[4] non-coated region

TABLE 6

Evaluation levels for the degree of filiform corrosion (the areas affected by corrosion are recorded in respect of the defect length)

| Evaluation level | Explanation |
|---|---|
| I | No to very mild FFC 90.0–0.5 mm$^2$/cm) |
| II | Mild FFC (>0.5–2.0 mm$^2$/cm) |
| III | Moderate FFC (>2.0–5.0 mm$^2$/cm) |
| IV | Severe FFC (>5.0–25 mm$^2$/cm) |
| V | Very severe FFC (>25 mm$^2$/cm) |

TABLE 7

Properties of treated aluminium surfaces coated with powder paint

| | Comp. ex. 1 GU 125 | | Comp. ex. 2 GU 126 | | Example 5 ARA 102 | | ARA 363 | Example 5[1)] GU 124.1 | | Example 4 ARA 364 |
|---|---|---|---|---|---|---|---|---|---|---|
| Top paint | PES/Primid | | PES/Primid | | PES/Primid | | PES/PT 910 | PES/Primid | | PES/PT 910 |
| Al alloy | AlMg1 | AlMgSi1 | AlMg1 | AlMgSi1 | AlMg1 | AlMgSi1 | AlMg1 | AlMg1 | AlMgSi1 | AlMg1 |
| Layer thickness S | 3 μm | 4 μm | 2 μm | 3 μm | 2 μm | 1 μm | 2 μm | 1 μm | 1 μm | 1 μm |
| Layer thickness TP | 75 μm | 92 μm | 87 μm | 75 μm | 75 μm | 64 μm | 50 μm | 81 μm | 71 μm | 45 μm |
| Adhesion (ISO 2409) | ch 0/0 | ch 0/1 | ch 0/0 | ch 0/0 | ch 0/0 | ch 0/0 | ch 0/0 | ch 0/0 | ch 0/0 | ch 0/0 |
| Boiling test (GSB) | ch 0/0 | ch 0/0 | ch 0/0 | ch 0/0 | ch 0/0 | ch 0/0 | ch 0/0 | ch 0/0 | ch 0/0 | ch 0/0 |
| CC (DIN 50017) | ch 0/0 | ch 0/0 | ch 0/0 | ch 0/0 | ch 0/0 | ch 0/0–1 | ch 0/0 | ch 0/0 | ch 0/0 | ch 0/0 |
| Mandrel flex test (ISO 6860) | flaked[3)] | cracks[3)] | o.k. (edge flaked)[3)] | o.k. (edge flaked)[3)] | o.k.[3)] | o.k.[3)] | o.k.[4)] | o.k.[3)] | o.k.[3)] | o.k.[4)] |
| ASS (ISO 9277; 1,000 h) | m1/g5[5)] m0/g0 | n.d. | m5/g5[5)] m1/g3 | n.d. | m0/g0 | 50%[5)] m0/g0 | m2/g4[5)] m0/g0 | m0/g0[5)] m0/g0 | 30%[5)] m1/g3 | m1/g1 |
| FFC (EN 3665; mm²/cm) | approx. 30 | 82[5)]/100 | 3[5)]/28 | 90 | 11[5)]/47 | 44[5)]/67 | 58[5)]/42 | 50 | 74 | 10[5)]/36 |

[1)]aq = aqueous
[2)]a = acid
[3)]2 mm mandrel
[4)]5 mm mandrel
[5)]non-coated region

What is claimed is:

1. Process for coating an aluminum substrate, comprising the following steps:
   a) hydrolytic condensation, optionally in the presence of a condensation catalyst and/or additives, of hydrolysable starting components, wherein said hydrolysable starting components are:
   (i) a crosslinkable silane of the formula (II)

$$R'''_m SiX_{(4-m)} \quad (II)$$

in which the groups X, which can be identical or different, are selected from the group consisting of hydrogen, halogen, alkoxy, acyloxy, alkylcarbonyl, alkoxycarbonyl and $NR''_2$ wherein each R'' is independently selected from the group consisting of H and alkyl, and the radicals R''', which can be identical or different, are selected from the group consisting of alkyl, alkenyl, alkinyl, aryl, arylalkyl, alkylaryl, arylalkenyl, alkenylaryl, arylalkinyl and alkinylaryl, wherein said radicals can be interrupted by O or S atoms or the group —NR'' and can carry one or more substituents selected from the group consisting of halogens and optionally substituted amino, amide, aldehyde, keto, alkylcarbonyl, carboxyl, mercapto, cyano, hydroxyl, alkoxy, alkoxycarbonyl, sulphonic acid, phosphoric acid, acryloxy, methacryloxy, epoxide and vinyl groups, wherein m has the value 1, 2 or 3, and/or an oligomer derived therefrom, wherein the radical R''' and/or the substituent is or includes a crosslinkable epoxide group, in an amount of 10 to 98 mol %, based on the total number of moles of the hydrolysable starting components, and
   (ii) an aluminium alkoxide of the formula (III)

$$Al(OR')_3 \quad (III)$$

wherein the radicals R', which can be identical or different are selected from the group consisting of alkyl and —$(CH_2)_x$—O—$(CH_2)_y$—$CH_3$, wherein x is an integer from 1 to 6 and y is an integer from 0 to 6, in an amount of 5 to 75 mol %, based on the total number of moles of the hydrolysable starting components, component (ii) being complexed,
   b) formation of a coating solution by addition of a prepolymer or reactive diluent, either of which is optionally crosslinkable with component (i), to the hydrolytic condensate obtained according to (a), wherein the prepolymer and the crosslinkable silane of the formula (II) form an interpenetrating network, and wherein the components do not include a non-crosslinkable silane;
   c) application of the coating solution obtained according to (b) to the aluminum substrate and drying of the coating solution to crosslink the hydrolytic condensate and/or the prepolymer and from a coating, wherein said coating exhibits improved adhesion to a tope layer and corrosion protection over the aluminum substrate.

2. The process according to claim 1, wherein the crosslinkable silane of the formula (II) is glycidyloxypropyltrimethoxysilane and aluminium secbutylate is used as the aluminium alkoxide of the formula (III).

3. The process according to claim 1, wherein, based on the total number of moles of the starting components,
   20 to 90 mol % of component (i) and
   10 to 50 mol % of component (ii)
   are employed.

4. The process according to claim 1, wherein the prepolymer is added in an amount of 2 to 95 mol %, based on the total number of moles of the starting components.

5. The process according to claim 1, wherein the additives are selected from the group consisting of organic diluents, flow agents, colouring agents, UV stabilizers, fillers, viscosity regulators, lubricants, wetting agents, antisedimentation agents or oxidation inhibitors or mixtures thereof.

6. The process according to claim 1, wherein a basic condensation catalyst is selected from the group consisting of aminosilanes and mercaptosilanes.

7. The process according to claims 1, wherein an acid is used as the condensation catalyst.

8. The process according to claim 7, wherein the condensation catalyst is phosphoric acid.

9. The process according to claim 1, wherein a solvent exchange is carreid out before step b).

10. The process according to claim 1, wherein a top paint is applied to the coated aluminum substrate.

11. The process according to claim 10, wherein the coated aluminum substrate is treated with a primer before application of the top paint.

12. A coated aluminum substrated obtained by the process according to claim 1.

13. The process according to claim 1, wherein said top layer includes a primer.

* * * * *